United States Patent [19]

Shamoto et al.

[11] Patent Number: 4,836,639

[45] Date of Patent: Jun. 6, 1989

[54] OPTICAL FIBER CABLE HAVING A NEUTRAL AXIS DEFINING A ZERO STRESS

[75] Inventors: Naoki Shamoto, Sakura; Hideo Suzuki, Funabashi; Yasuyuki Sugawara, Shisui; Masaaki Kawase, Mito; Hiromichi Shinohara, Tokyo, all of Japan

[73] Assignees: Fujikura Ltd.; Nippon Telegraph and Telephone Corporation, both of Tokyo, Japan

[21] Appl. No.: 21,097

[22] Filed: Mar. 3, 1987

[30] Foreign Application Priority Data

Mar. 4, 1986 [JP] Japan .................................. 61-46766

[51] Int. Cl.⁴ .............................................. G02B 6/44
[52] U.S. Cl. .................................................. 350/96.23
[58] Field of Search .................................... 350/96.23

[56] References Cited

U.S. PATENT DOCUMENTS 4,342,500 8/1982 Oestreich et al. ............... 350/96.23

FOREIGN PATENT DOCUMENTS

| 2854717 | 6/1980 | Fed. Rep. of Germany . | |
| 3232108 | 3/1984 | Fed. Rep. of Germany ... | 350/96.23 |
| 3309996 | 9/1984 | Fed. Rep. of Germany . | |
| 2481812 | 11/1981 | France . | |
| 2534385 | 4/1984 | France . | |
| 2562272 | 10/1985 | France ............................... | 350/96.23 |
| 0110110 | 5/1986 | Japan ................................ | 350/96.23 |
| 0201211 | 9/1986 | Japan ................................ | 350/96.23 |
| 1583383 | 1/1981 | United Kingdom ............ | 350/96.23 |

Primary Examiner—John D. Lee
Assistant Examiner—John Ngo
Attorney, Agent, or Firm—Sprung Horn Kramer & Woods

[57] ABSTRACT

An optical fiber cable includes a flexible pipe of a plastics material, and a group of optical fibers loosely mounted within an axial bore of the pipe and held in contact with an inner surface of a peripheral wall of the pipe. At least one elongated flexible reinforcing member is embedded in the peripheral wall of the pipe and extends along a longitudinal axis of the cable, the reinforcing member being disposed in the vicinity of the group of optical fibers and made of a material having a higher Young's modulus than that of the plastics material of which the pipe is made. The optical fiber cable has a neutral axis extending through the bore of the pipe and defining a line of zero stress when the cable is bent longitudinally in a direction to dispose the reinforcing member radially inwardly of the group of optical fibers. The group of optical fibers are disposed on the neutral axis, so that the optical fibers are not subjected to axial contraction or elongation when the cable is bent in the direction.

13 Claims, 3 Drawing Sheets

OPTICAL FIBER CABLE HAVING A NEUTRAL AXIS DEFINING A ZERO STRESS

BACKGROUND OF THE INVENTION

1. Field of the Invention

This invention relates to an optical fiber cable.

2. Prior Art

A conventional optical fiber cable 10e shown in FIG. 1 comprises an elongated reinforcing core 11, a plurality of optical fibers 18a spirally wound around the reinforcing core 11, and a sheath 13 covering the optical fibers, the cross-sectional shape of the cable being symmetrical with respect to a longitudinal axis of the cable.

It has been proposed to loosely mount a bundle of optical fibers 18a, tied together by yarns or the like into a generally circular cross-sectional shape, in a pipe 12e of a plastics material to provide an optical fiber cable 10f as shown in FIG. 2. Another alternative is to loosely mount a plurality of juxtaposed optical fibers 18a in the pipe 12e to provide an optical fiber cable 10g as shown in FIG. 3. Either of the bundle of optical fibers 18a and the juxtaposed optical fibers 18a are held in contact with the inner peripheral surface of the pipe 12e. These methods are advantageous in that the manufacture of the optical fiber cables 10f and 10g can be simplified since the optical fibers 18a are not wound around a reinforcing core as is the case with the first-mentioned conventional cable 10e.

When the optical fiber cable 10e of a symmetrical construction shown in FIG. 1 is to be wound around a drum, there is no need to take the upper and lower sides of the cable into consideration. However, when the optical fiber cable 10f, 10g of either FIG. 2 or FIG. 3, is to be wound around a drum, it is necessary to take the upper and lower sides of the cable into consideration. Particularly, a serious problem arises that the end of the optical fibers 18a can be displaced with respect to the end of the pipe 12e either when the optical fiber cable is transferred between two drums of different diameters or when the optical fiber cable is unwound from the drum so as to be extended.

For example, if the optical fibers 18a and pipe 12e of the optical fiber cable 10f of FIG. 2 have substantially the same length when the optical fiber cable is extended straight, and when the optical fiber cable is wound around a drum, the fiber bundle is displaced relative to the pipe 12e an amount of $2\pi(l_2-l_1)$ per one turn of the optical fiber cable. And, then, if the extended end of the fiber bundle is cut off to be brought into agreement with the end of the pipe 12e and is fixedly secured thereto and if the optical fiber cable is unwound from the drum, the end of the fiber bundle tends to be displaced inwardly longitudinally with respect to the end of the pipe, so that the fiber bundle is elongated and is subjected to undue pressure or tension, which results in an increased transmission loss.

When the optical fiber cable 10f of FIG. 2 is bent as shown in FIG. 4, the inner side of the pipe 12e is contracted while the outer side is extended or elongated, and there exists a neutral axis between the inner side and outer side of the pipe 12e at which neutral axis there occures no contraction and extension. Since the peripheral wall of the pipe 12e of a circular cross-section has a uniform thickness, the neutral axis coincides with a longitudinal axis 0 of the pipe 12e. However, in the case where the pipe 12e is modified in such a manner that the cross-sectional shape of the pipe 12e is not symmetrical with respect with the longitudinal axis, the neutral axis of the pipe is displaced from the axis. Therefore, if the optical fibers 18a are disposed so as to include the neutral axis, the optical fibers are not displaced longitudinally with respect to the pipe even when the optical fiber cable is wound around and unwound from the drum.

SUMMARY OF THE INVENTION

It is therefore an object of this invention to provide an optical fiber cable which prevents ends of optical fibers, loosed received within a pipe, from being displaced longitudinally with respect to the pipe even when the cable is wound around and unwound from a drum.

According to the present invention, there is provided an optical fiber cable comprising a flexible pipe of a plastics material defined by a peripheral wall and having an axial bore therethrough; a group of optical fibers loosely mounted within the bore and held in contact with an inner surface of the peripheral wall of the pipe; and at least one elongated flexible reinforcing member embedded in the peripheral wall of the pipe and extending along a longitudinal axis of the cable, the reinforcing member being disposed in the vicinity of the group of optical fibers and made of a material having a higher Young's modulus than that of the plastics material, the optical fiber cable having a neutral axis extending through the bore and defining a line of zero stress when the cable is bent longitudinally in a direction to dispose the reinforcing member radially inwardly of the group of optical fibers, the group of optical fibers being disposed on the neutral axis.

The reinforcing member or members of a high Young's modulus are embedded in the peripheral wall of the pipe in such a manner that the neutral axis lies in the group of the optical fibers, so that the optical fibers are not hardly contracted and elongated even when the optical fiber cable is bent longitudinally in the above-mentioned direction so as to be wound around a drum. Thus, the ends of the optical fibers will not be retracted or extended from the pipe when the optical fiber cable is wound around or unwound from the drum. With this construction, the optical fiber cable can be easily manufactured and is not subjected to variations in quality. By virtue of the provision of the reinforcing members of a high Young's modulus, the optical cable is subjected to less elongation strain and residual strain when the cable is installed. In addition, the optical fiber cable is subjected to less elongation and contraction due to variations in temperature.

DESCRIPTION OF THE PREFERRED EMBODIMENTS OF THE INVENTION

Figure 1:
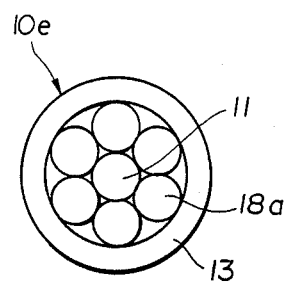
FIG. 1 is a cross-sectional view of a conventional optical fiber cable.
Figures 2, 3:
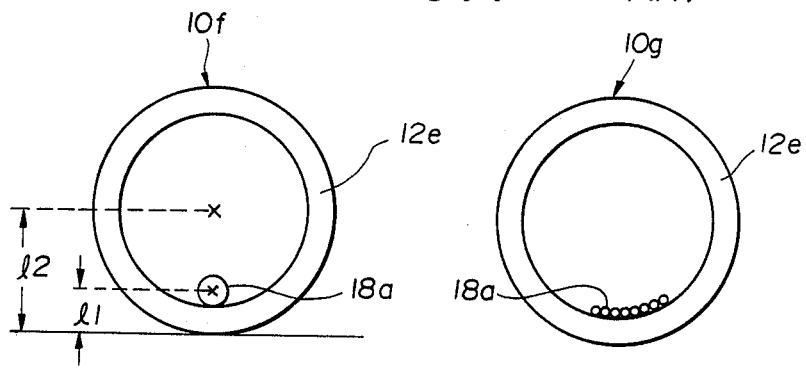
FIG. 2 is a cross-sectional view of another conventional optical fiber cable.
FIG. 3 is a view similar to FIG. 2 but showing a further conventional optical fiber cable.
Figure 4:
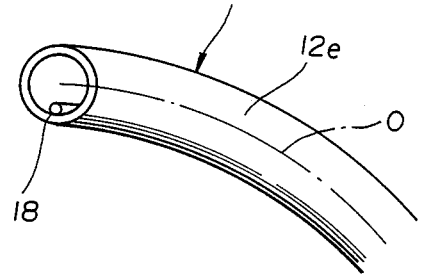
FIG. 4 is a fragmentary perspective view of the optical fiber of FIG. 2.

The invention will now be described with reference to the drawings in which like reference numeral denote corresponding parts in several views.

Figure 5:
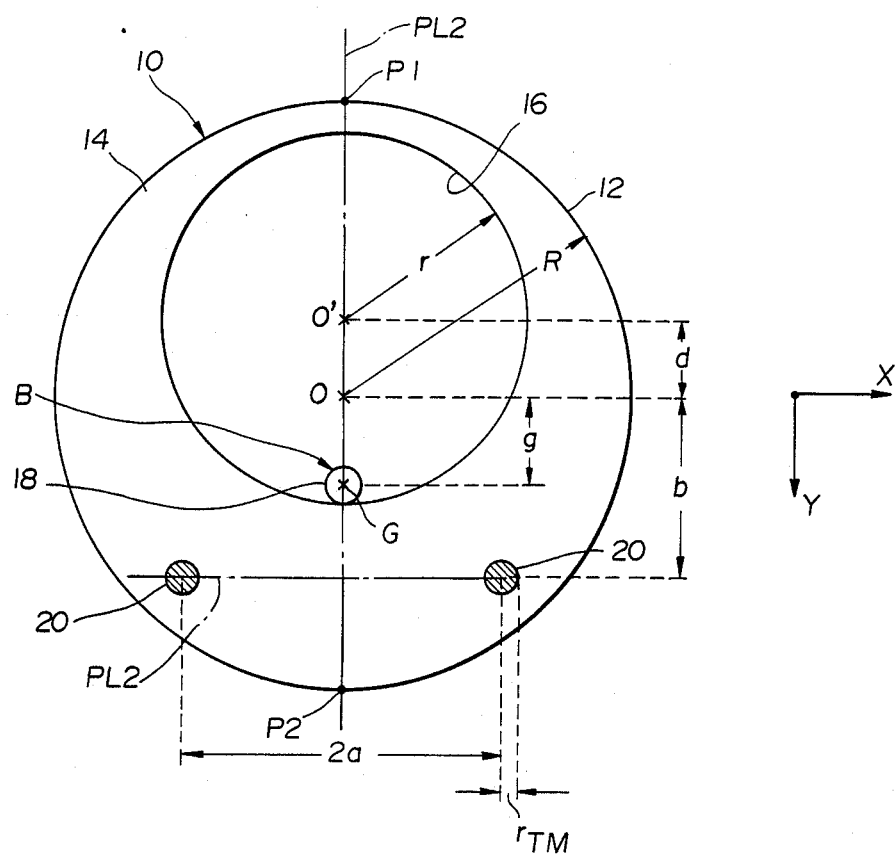
FIG. 5 is a cross-sectional view of an optical fiber cable provided in accordance with the present invention.

An optical fiber cable 10 shown in FIG. 5 comprises a flexible circular pipe 12 of a plastics material having a peripheral wall 14 defining the pipe 12 having an axial bore 16 of a circular shape therethrough, a bundle B of optical fibers 18 mounted loosely within the bore 16 and held in contact with an inner peripheral surface of the pipe 12, a plurality of, say, two flexible reinforcing wires 20 embedded in the peripheral wall 14 of the pipe 12 and extending along a longitudinal axis of the pipe 12, the reinforcing wires 20 being disposed in the vicinity of the fiber bundle B. The bundle of optical fibers 18 are tied together by yarns wound therearound so that the fiber bundle has a generally circular cross-section. The reinforcing wires 20 are spaced from each other and made of a material having a high tensile strength and having a much higher Young's modulus than the plastics material of which the pipe 12 is made. For example, the reinforcing wire 20 is made of a galvanized steel, steel, glass FRP, carbon FRP or the like. Those materials that have a relatively low bending rigidity such as fibrous materials are not suited for the reinforcing wires 20.

The optical fiber cable 10 has a neutral axis G extending along a longitudinal axis thereof through the bore 15 and defining a line of zero stress when the optical fiber cable 10 is bent longitudinally downwardly, that is, in a direction Y (FIG. 5) so as to dispose the reinforcing members 20 radially inwardly of the fiber bundle B. The fiber bundle B lies on or includes the neutral axis G, so that the fiber bundle B is hardly contracted and elongated when the optical fiber cable 10 is bent longitudinally downwardly.

A detailed construction of the optical fiber cable 10 will now be described with reference to FIG. 5. The pipe 12 has a radius R while the axial bore 16 has a radius r. The center 0' of the bore 16 is eccentric from the center 0 of the pipe 12 a distance d. In the case where d is zero (d=0), the pipe 12 has a uniform thickness throughout the entire circumference thereof. The pipe 12 has Young's modulus $E_p$, and the peripheral wall 14 is gradually increasing in thickness circumferentially from one point P1 to another point P2 disposed in diametrically opposite relation to point P1. The pair of reinforcing wires 20 each having Young's modulus $E_{TM}$ are embedded in the thickened portion of the peripheral wall 14 and lie on a plane PL1 perpendicular to a plane PL2 on which the axes or centers 0' and 0, the center or axis of the fiber bundle B and the points P1 and P2.

The arrangement of the reinforcing wires 20 is symmetrical with respect to the plane PL2, and the cross-section of the pipe 12 is symmetrical with respect to the plane PL2. The plane PL1 on which the centers of the reinforcing wires 20 lie is spaced from the axis or center 0 of the pipe 12 a distance b. Preferably, the number of the reinforcing wires 20 is more than one as in this embodiment, since with such a construction, the optical fiber cable 10 can be bent in the direction Y more easily than in a direction X perpendicular to the direction Y. This ensures that the optical fiber cable 10 is wound around a drum in the intended direction, that is, in the direction Y. However, only one reinforcing wire 20 may be employed, in which case the reinforcing wire 20 lies in the plane PL2. Where the number of the reinforcing wires 20 is represented by n, and the distance between the centers of the opposite outermost wires 20 is represented by a, the distance between the centers of each adjacent wires 20 is represented by $2a/(n-1)$.

1. Formulas relating to the neutral axis G

When the optical fiber cable 10 is bent longitudinally downwardly, that is, in the direction Y, with a radius $\rho$ of curvature, the integral of the stress $\sigma$ across the entire cross-sectional area A of the thus bent cable 10 is zero since the cable 10 is subjected to tension or elongation above the neutral axis while the cable 10 is subjected to compression or contraction below the neutral axis, and this is represented by the following formula (1):

$$\int_A \sigma \, dA = 0 \tag{1}$$

The following formula (2) is obtained through the integration with respect to FIG. 5:

$$E_p R_g^2 - E_p r^2(g+d) + n(E_{TM} - E_p) r_{TM}^2 (g-b) = 0 \tag{2}$$

The following formula (3) is obtained from formula (2):

$$\left( n + \frac{E_p}{E_{TM} - E_p} \times \frac{R^2 - r^2}{r_{TM}^2} \right) g = \left( n + \frac{E_p}{E_{TM} - E_p} \times \frac{r^2}{r_{TM}^2} \times \frac{d}{b} \right) b \tag{3}$$

In the case where the pipe 12 has a uniform thickness throughout the entire circumference thereof (i.e., d=0), the right side of formula (2) is zero.

2. Formulas relating to bending rigidities

In order that the fiber bundle B lies on the neutral axis, the optical fiber cable 10 must be wound around a drum with the reinforcing wires 20 being disposed radially inwardly of the fiber bundle B. Therefore, the following formula (4) must be established:

$$(EI)_{0°} < (EI)_{90°} \tag{4}$$

wherein $(EI)_{0°}$ is a bending rigidity of the cable 10 in the Y direction, and $(EI)_{90°}$ is a bending rigidity of the cable in the X direction.

The following formulas are obtained through the formula of the strength of materials:

$$\frac{4}{\pi}(EI)_{0°} = E_p(R^4 - r^4) + 4E_p R^2 g^2 - 4E_p r^2(g+d)^2 + n(E_{TM} - E_p)r_{TM}^4 + 4n(E_{TM} - E_p)\,r_{TM}^2(g-b)^2$$

$$\frac{4}{\pi}(EI)_{90°} = E_p(R^4 - r^4) + n(E_{TM} - E_p)r_{TM}^4 + \frac{4}{3} \cdot \frac{n(n+1)}{n-1}(E_{TM} - E_p)r_{TM}^2 \cdot a^2$$

The following formula (5) is obtained from formula (4):

$$\frac{E_p}{E_{TM} - E_p} \cdot \frac{R^2 g^2 - r^2(g+d)^2}{r_{TM}^2} < \quad (5)$$

$$\frac{n}{3}\left[\frac{n+1}{n-1}a^2 - 3(g-b)^2\right]$$

Thus, in order that the optical fiber cable 10 can be properly wound around the drum, formula (5) must be satisfied. If d is zero (d=0), the following formula (6) is obtained:

$$\frac{E_p}{E_{TM} - E_p} \cdot \frac{R^2 - r^2}{r_{TM}^2} \cdot g^2 < \frac{n}{3}\left[\frac{n+1}{n-1}a^2 - 3(g-b)^2\right] \quad (6)$$

3. The reinforcing wires 20 must be embedded in the peripheral wall 14 of the pipe 12, the following formulas (7) and (8) must be satisfied:

$$a^2 + b^2 < (R - r_{TM})^2 \quad (7)$$

$$b > r - d + r_{TM} \quad (8)$$

A limitation on the number of the reinforcing members 20 is expressed by the following formula (9):

$$a > (n-1)r_{TM} \quad (9)$$

The optical fiber cable 10 must be designed so as to satisfy these formulas as well as the formulas (3) and (5).

Based on the above formulas, examples of optical fiber cables are given below. If the diameter of the fiber bundle B of a round cross-section is indicated by $r_m$, the distance g between the axis of the pipe 12 and the neutral axis G is represented by the following formula:

$$g = r - r_m$$

However, if the diameter $r_m$ of the fiber bundle B is quite small and ($r_m << r$) is provided, then it can be almost considered that the neutral axis G lies on the inner surface of the peripheral wall 14 of the pipe 12.

EXAMPLE 1

Figure 6:
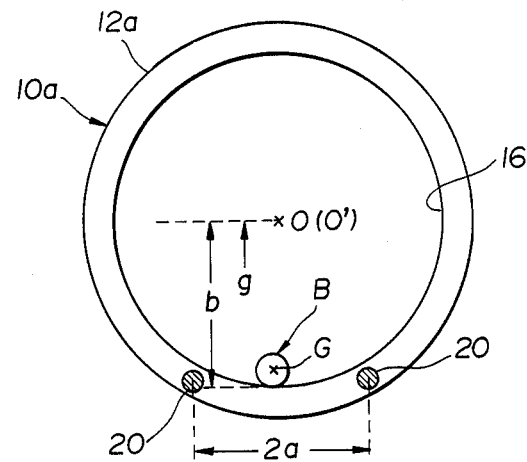

An optical fiber cable 10a shown in FIG. 6 and including a fiber bundle B of a circular cross-section is designed under the following conditions: A pipe 12a is made of polyethylen (PE), and reinforcing wires 20 are in the form of a galvanized steel wire.

R = 12 mm
r = 10 mm
$r_{TM}$ = 0.7 mm
n = 2
$r_m$ = 1 mm
d = 0
$E_P$ = 30 kg/mm$^2$
$E_{TM}$ = 21,000 kg/mm$^2$

Therefore, g is 0.9 mm, and (b=9.58 mm) is obtained from the above formula (3). (a=5.37 mm) is obtained from the following formula, and this value satisfies the above formula (6):

$$a + b = [(R+r)/2]$$

EXAMPLE 2

Figure 7:
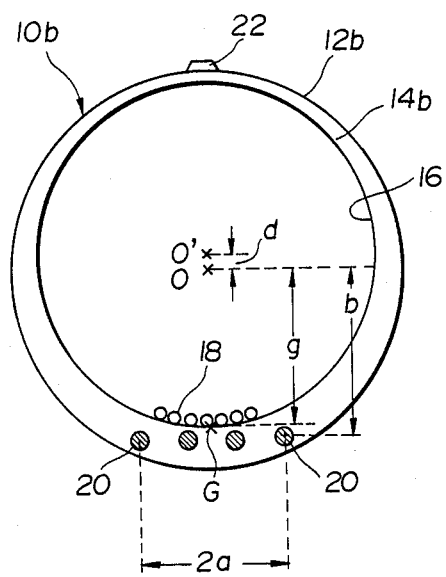

An optical cable 10b, shown in FIG. 7 and including a group of juxtaposed optical fibers 18 held in contact with an inner surface of a peripheral wall 14b of a pipe 12b, is designed under the following conditions: Each of the optical fibers 18 is very thin or narrow and has a diameter, for example, of 0.3 mm, and therefore the centers of the optical fibers 18 are almost disposed on the inner surface of the peripheral wall 14b. Therefore, in this example, the neutral axis G on which the fiber group is disposed almost on the inner surface of the peripheral wall 14b, so that the neutral axis G is also lies almost on the inner surface of the peripheral wall 14b. In this example, the neutral axis G is disposed centrally of the width of the juxtaposed optical fiber 18. A pipe 12b is made of polyethylen (PE), and four reinforcing wires 20 are in the form of a galvanized steel wire.

R = 18 mm
r = 15 mm
$r_{TM}$ = 0.8 mm
n = 4
d = 1 mm
$E_P$ = 30 kg/mm$^2$
$E_{TM}$ = 21,000 kg/mm$^2$

Therefore, (g=14 mm), (b=15.3 mm) and (a=6.675 mm) are provided. The pitch of the reinforcing wires 20 is 4.45 mm. In this example, the pipe 2 has a ridge 22 formed on the outer surface thereof and extending along the axis thereof. The optical fiber cable 10b is wound around the drum with the ridge 22 directed outwardly.

Figure 8:
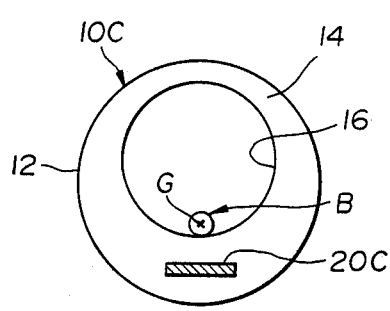
FIGS. 6 to 10 are cross-sectional views of modified optical fiber cables.
Figure 10:
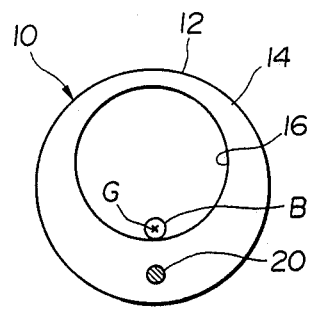

FIG. 8 shows a modified optical fiber cable 10c which differs from the optical fiber cable 10 of FIG. 1 only in that the reinforcing wires 20 are replaced by a single reinforcing strip 20c. The reinforcing strip 20c is made of the same material as the reinforcing wires 20.

Figure 9:
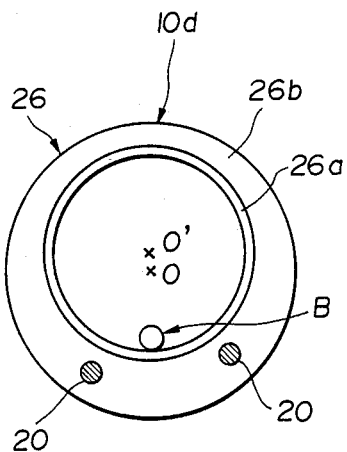

FIG. 9 shows another modified optical fiber cable 10d which differs from the optical fiber cable 10 of FIG. 1 only in that a composite pipe 26 replaces the pipe 12. The composite pipe comprises an inner pipe 26a accommodating a fiber bundle B, and an outer pipe 26b formed around the inner pipe 26a. The inner pipe 26a is composed of a pipe body of a plastics material and a metal foil such as aluminum secured to the entire inner surface of the pipe body by an adhesive to form a metal layer. The inner pipe 26a may be made entirely of nylon. In these cases, it is necessary to take into account Young's modulus of the aluminum or the nylon.

While the optical fiber cables according to the present invention have been specifically shown and described herein, the invention itself is not to be restricted to the exact showing of the drawings or the description thereof. For example, viscous or jelly-like waterproof agent may be filled in the pipe 12, 26 so as to prevent the optical fibers 18 from being deteriorated by water or moisture.

What is claimed is:

1. An optical fiber cable comprising:
   (a) a flexible pipe of a plastics material defined by a peripheral wall and having an axial bore therethrough;
   (b) a group of optical fibers loosely mounted within said bore and movable into contact with an inner surface of said peripheral wall of said pipe; and
   (c) at least one elongated flexible reinforcing member embedded in the peripheral wall of said pipe and extending along a longitudinal axis of said cable, said reinforcing member being disposed in the vicinity of said group of optical fibers and made of a material having a higher Young's modulous than that of the plastics material; wherein a cross-section of said optical fiber cable has a neutral axis extending through said bore defining a line of zero stress when said cable is bent longitudinally in a first direction to dispose said reinforcing member radially inwardly of said group of optical fibers, and said group of optical fibers is disposed on said neutral axis.

2. An optical fiber cable according to claim 1, comprising a plurality of said reinforcing members disposed on a first plane perpendicular to a second plane on which the longitudinal axis of said pipe and said group of optical fibers are disposed, an arrangement of said reinforcing members being symmetrical with respect to said first plane, and a cross-section of said pipe being symmetrical with respect to said first plane.

3. An optical fiber cable according to claim 2, in which a bending rigidity of said cable in said first direction is smaller than a bending rigidity of said cable in a second direction perpendicular to said first direction.

4. An optical fiber cable according to claim 1, in which a center of said group of optical fibers lies on said neutral axis.

5. An optical fiber cable according to claim 1, in which said group of optical fibers is a bundle of a generally circular cross-section.

6. An optical fiber cable according to claim 1, in which said optical fibers are disposed in juxtaposed relation to one another.

7. An optical fiber cable according to claim 1, in which said neutral axis is almost disposed on the inner surface of said peripheral wall of said pipe.

8. An optical fiber cable according to claim 1, in which said reinforcing member is in the form of a strip.

9. An optical fiber cable according to claim 1, in which said pipe comprises a composite pipe of plastics material having a metal layer formed on an inner surface thereof.

10. An optical fiber cable according to claim 1, in which a waterproof agent is filled in said bore of said pipe.

11. An optical fiber cable comprising:
(a) a flexible pipe of a plastics material defined by a peripheral wall and having an axial bore therethrough defined by an inner surface of said peripheral wall;
(b) a group of optical fibers loosely accommodated within said bore; and
(c) at least one elongated flexible reinforcing member embedded in the peripheral wall of said pipe and extending along a longitudinal axis of said cable, said reinforcing member being made of a material having a higher Young's modulous than that of the plastics material; wherein a cross-section of said optical fiber cable has a neutral axis defining a line of zero stress when said cable is bent longitudinally in a direction to dispose said reinforcing member radially inwardly of said group of optical fibers, said neutral axis extending through said bore adjacent to a point on said inner surface which point being radially innermost when said cable is bent as above-mentioned, whereby said group of optical fibers is disposed on said neutral axis when said cable is bent as above-mentioned.

12. A optical fiber cable according to claim 11, having a first plane including said longitudinal axis and with respect to which said reinforcing member and said pipe are disposed symmetrically, and a second plane including said longitudinal axis and said neutral axis, said second plane being perpendicular to said first plane.

13. An optical fiber cable according to claim 12, wherein said pipe and said reinforcing members are so disposed that a bending rigidity of said cable for a bending in said first plane is smaller than a bending rigidity of said cable for a bending in said second plane.

* * * * *